United States Patent [19]
Hobrecht

[11] Patent Number: 5,337,023
[45] Date of Patent: Aug. 9, 1994

[54] REDUCED PHASE-JITTER HORIZONTAL SWEEP CONTROL PHASE-LOCK-LOOP AND METHOD

[75] Inventor: Stephen W. Hobrecht, Los Altos, Calif.

[73] Assignee: National Semiconductor Corporation, Santa Clara, Calif.

[21] Appl. No.: 69,617

[22] Filed: Jun. 1, 1993

[51] Int. Cl.⁵ .................. H03L 7/06; H03L 7/07
[52] U.S. Cl. ........................... 331/20; 331/2; 331/17; 348/536
[58] Field of Search ............ 331/2, 10, 11, 17, 20, 331/25

[56] References Cited

U.S. PATENT DOCUMENTS

| | | | |
|---|---|---|---|
| 3,846,584 | 11/1974 | Itoh et al. | 331/20 X |
| 4,396,948 | 8/1983 | Fernsler et al. | 331/20 X |
| 4,660,080 | 4/1987 | Dietz et al. | 331/20 X |
| 4,761,587 | 8/1988 | Wharton | 331/20 X |
| 4,891,608 | 1/1990 | Ikeda | 331/20 |

OTHER PUBLICATIONS

"Synchronous Deflection LSI For Multi-Sync. Display TV Receiver," *Bipolar Integrated Circuits*, NEC Corporation, pp. 1–20, (Jul. 1989).

"New Phase-Locked-Loops Have Advantages as Frequency to Voltage Converters (and More)," National Semiconductor Corp. Application Note, pp. 482–491, R. Pease, (no date).

"LM 1391 Phase-Locked Loop," National Semiconductor Corporation, pp. 3-34—3-39.

*Primary Examiner*—David Mis
*Attorney, Agent, or Firm*—Limbach & Limbach

[57] ABSTRACT

A horizontal sweep control synchronization circuit fixes the phase relationship between a horizontal synch pulse signal and a flyback signal by utilizing a first phase-lock-loop to fix the phase relationship between an oscillator signal, generated by the first loop, and the synch pulse signal, and a second loop to fix the phase relationship between the flyback signal and the oscillator signal. The first loop locks an edge of the synch pulse signal to the center of the oscillator signal, thereby allowing the synch pulse signal to remain locked to the oscillator signal during vertical retrace. The synchronization circuit only utilizes a single ramp forming circuit, thereby eliminating the jitter associated with multiple ramp forming circuits.

17 Claims, 6 Drawing Sheets

REDUCED PHASE-JITTER HORIZONTAL SWEEP CONTROL PHASE-LOCK-LOOP AND METHOD

BACKGROUND OF THE INVENTION

Field of the Invention

The present invention relates to phase-lock-loops (PLL) and, in particular, to a reduced jitter PLL in a horizontal sweep control circuit which is suitable for implementation as a monolithic integrated circuit.

Background of the Related Art

A horizontal sweep control circuit is a circuit that controls the horizontal sweep of an electron beam as it moves across each line of the display screen of a cathode ray tube (CRT). A picture is formed on the display screen when the electron beam excites phosphor on the screen. The intensity of the electron beam, and therefore the picture, is controlled by a video signal.

As is well known, the National Television Systems Committee (NTSC) standard defines the frequency of the video signal along with various control signals which are incorporated within the video signal. Recently, however, new standards are emerging which define video signals with frequencies which are from two to eight times greater than the frequency of a standard television video signal. Additionally, these new standards often incorporate differing control signals. As a result, there is a need for a horizontal sweep control circuit that can operate within these new standards.

The conventional horizontal sweep control circuit typically includes a deflection yoke that controls the horizontal movement of the electron beam. The deflection yoke controls the horizontal movement of the beam by generating a magnetic field which steers the beam. As is well known, both a positive and a negative magnetic field are formed when the yoke conducts a positive and a negative yoke current, respectively.

A resonance circuit sinks and sources the positive yoke current and the negative yoke current, respectively, from the deflection yoke. The resonance circuit typically includes a transistor that sinks the positive yoke current in response to a control signal, a capacitor that stores the energy released from the deflection yoke when the transistor stops sinking the positive yoke current, and a damper diode that provides a path for the negative yoke current.

In operation, the control signal turns on the transistor which then sinks the positive yoke current from the deflection yoke. In addition to forming the positive magnetic field, the positive yoke current causes a positive current energy to be stored in the yoke.

At the end of each horizontal sweep, the control signal turns off the transistor which then stops sinking the positive yoke current. When the positive yoke current stops, the positive current energy stored in the yoke is released as an inductive yoke current which charges up the capacitor.

When the positive current energy is depleted and the inductive current ends, the capacitor begins sourcing the negative yoke current back into the yoke. The negative yoke current reverses the polarity of the magnetic field, thereby forming the negative magnetic field. The diode limits the low voltage of the capacitor as the capacitor sources the negative yoke current, thereby stopping the oscillation between the yoke and the capacitor after the first half cycle.

During the transition from the end of the positive yoke current to the beginning of the negative yoke current, the rapid change in yoke current causes the generation of a half sine-waveform flyback pulse. Since the flyback pulse coincides with the end of the positive yoke current, a phase-lock-loop is utilized to set a phase relationship between the flyback pulse and a horizontal sync pulse signal which, as is well known, defines the end of each line of the horizontal sweep. By controlling the phase relationship between the horizontal sync pulse signal and the flyback signal, the end of each line of the horizontal sweep can be adjusted relative to the horizontal sync pulse signal.

FIG. 1 shows a block diagram of a conventional horizontal sweep control PLL 10. As shown in FIG. 1, PLL 10 includes a horizontal sync re-generator 12 that generates a square-wave intermediate sync pulse signal VISP in response to a horizontal sync pulse signal VHSP. Horizontal sync re-generator 12 generates the intermediate sync pulse signal VISP, in part, by charging and discharging a capacitor within horizontal sync re-generator 12.

A phase detector 14 compares the intermediate sync pulse signal VISP to an intermediate flyback signal VIFB and then generates an error signal VERR which indicates the phase difference between the intermediate sync pulse signal VISP and the intermediate flyback signal VIFB. Phase detector 14 generates the error signal VERR by charging a capacitor within phase detector 14 in response to the leading edge of the intermediate sync pulse signal VISP, by discharging the capacitor when the leading edge of the intermediate flyback signal exceeds a threshold voltage, and by stopping the charging or discharging of the capacitor in response to the trailing edge of the intermediate sync pulse signal VISP.

FIG. 2 shows a timing diagram of the operation of phase detector 14 which illustrates the horizontal sync pulse signal VHSP, the intermediate sync pulse signal VISP, the intermediate flyback signal VIBF, and the error signal VERR. As shown in FIG. 2, the leading edge 15 and the falling edge 17 of the intermediate sync pulse signal VISP is formed by the horizontal sync re-generator 12 to be substantially coincident with the leading edge 19 and the falling edge 21 of the horizontal sync pulse signal VHSP. The error signal VERR begins charging in response to the leading edge 15 of the intermediate sync pulse signal VISP, begins discharging in response to the leading edge 23 of the intermediate flyback signal VIBF, and stops discharging in response to the falling edge 17 of the intermediate sync pulse signal VISP. When the flyback signal (not shown) is locked onto the horizontal sync pulse signal VHSP, the ending voltage of the error signal VERR is equivalent to the starting voltage.

As further shown in FIG. 2, the horizontal sync pulse signal VHSP includes an interlaced pulse VILP which is utilized for interlaced scanning. When interlaced scanning is not being performed, proper operation of the horizontal sweep control circuit requires that the interlaced pulse VILP be ignored. Thus, as shown in FIG. 2, horizontal sync re-generator 12 must generate an intermediate sync pulse signal which ignores the interlaced pulse VILP.

Referring again to FIG. 1, the intermediate flyback signal VIFB represents the original half sine-waveform flyback signal VOFB generated by the resonance circuit (not shown) which has been modified by a delay one shot 16 and a ramp former 18. Delay one shot 16, which generates a square-wave flyback signal VSFB in response to the original flyback signal VOFB, provides a technique for phase delaying the original flyback signal VOFB with respect to the horizontal sync pulse signal VHSP.

As shown in FIG. 1, the amount of phase delay can be varied by adjusting a potentiometer 20. By phase delaying the flyback signal VOFB, the horizontal position of an image on the CRT screen can be adjusted. Delay one shot 16 generates the square-wave flyback signal VSFB, in part, by charging and discharging a capacitor within delay one shot 16.

Ramp former 18 then generates the intermediate flyback signal VIFB by converting the square-wave flyback signal VSFB into a ramp waveform. Ramp former 18 also generates the intermediate flyback signal VIFB, in part, by charging and discharging a capacitor within ramp former 18. As stated above, phase detector 14 then compares the intermediate flyback signal VIFB with the intermediate sync pulse signal VISP to generate the error voltage VERR.

A summing circuit 22 combines a set voltage VSET and the error voltage VERR to produce a summed voltage VSUM which sets a voltage controlled oscillator (VCO) 24 to generate a triangle-wave oscillator output signal VOSC at a frequency which is substantially equivalent to the frequency of the horizontal sync pulse signal VHSP. VCO 24 also generates the oscillator output signal VOSC, in part, by charging and discharging a capacitor within VCO 24.

The set voltage VSET is generated by a frequency-to-voltage converter 26 which senses the frequency of the horizontal sync pulse signal VHSP. In operation, the set voltage VSET is generated to be proportional to the frequency of the horizontal sync pulse signal VHSP and is the primary contributor to the summed voltage VSUM which, as stated above, sets VCO 24 to generate the oscillator output signal VOSC at a frequency which is substantially equivalent to the frequency of the horizontal sync pulse signal VHSP.

Since the set voltage VSET is the primary factor in setting the frequency of the oscillator signal VOSC, by changing the set voltage VSET the frequency of the oscillator signal VOSC can be changed to track the frequency of a number of different horizontal sync pulse signals VHSP, each of which correspond to a different display type, over a wide frequency range. Thus, PLL 10 can automatically lock onto or acquire a number of different horizontal sync pulse signals without the need to manually readjust the PLL each time the frequency of the horizontal sync pulse signal changes.

As further shown in FIG. 1, the control signal VC represents the oscillator output signal VOSC which has been modified by a duty cycle comparator 28 and an output driver 30. Duty cycle comparator 28, which generates a square-wave intermediate oscillator signal VSSC in response to the ramp-waveform oscillator output signal VOSC, provides a technique for varying the duty cycle of the control signal VC.

As shown in FIG. 1, the duty cycle can be varied by adjusting a potentiometer 32. By varying the duty cycle of the control signal VC, both the image distortion and the efficiency of the horizontal sweep control circuit can be optimized. Output driver 30 then generates the control signal VC by driving the intermediate oscillator signal VSSC out to the base of the transistor of the resonance circuit (not shown).

As stated above, horizontal sync re-generator 12, delay one shot 16, ramp former 18, and VCO 24 each operate, in part, by charging and discharging internal capacitances with respect to some defined voltage. Typically switching comparators are utilized to determine when the voltages on the respective internal capacitances have reached the desired voltage level. As is well known, switching comparators generate noise in the process of comparing one voltage to another.

As a result, the principal disadvantage of PLL 10 is that during each horizontal sync pulse period the many switching comparators associated with PLL 10 introduce a substantial phase jitter. Since modern CRTs are using shorter horizontal scan lines, the phase jitter produced by PLL 10 limits the maximum frequency of operation for a set performance standard. Thus, there is a need for a horizontal sweep control PLL that reduces the phase jitter, thereby increasing the total amount of each horizontal scan line that can be utilized for video information.

SUMMARY OF THE INVENTION

The present invention provides a horizontal sweep control synchronization circuit that fixes the phase relationship between a horizontal synch pulse signal and a flyback signal by utilizing a first phase-lock-loop to fix the phase relationship between an oscillator signal and the synch pulse signal, and second phase error signal in response thereto so that the second phase error signal indicates the phase difference between the edge of the second intermediate oscillator signal and the center of the second input signal. The second input signal can include, for example, the flyback signal generated by the deflection yoke of a cathode ray tube. The combiner generates a fourth threshold voltage by combining the voltage of the second phase error signal and a duty cycle voltage. The phase shifter produces a control signal that has a pulse waveform in response to the oscillator signal, the voltage of the second phase error signal, and the fourth threshold voltage so that the control signal has a phase which varies with the second phase error signal.

In operation, the first phase error signal causes the frequency of the oscillator signal to change until the first intermediate oscillator signal locks onto the first input signal. The second phase error signal causes the phase of the control signal to change until the phase of the second input signal locks onto the phase of the second intermediate oscillator signal. Since the oscillator signal is locked onto the first input signal via the first intermediate oscillator signal, and since the second input signal is locked onto the oscillator signal via the second intermediate oscillator signal, the synchronization circuit controls the phase relationship between the first input signal and the second input signal.

The phase shifter includes a first phase shift comparator that generates the rising edge of the control signal when the voltage of the oscillator signal passes the fourth threshold voltage, and a second phase shift comparator that generates the falling edge of the control signal when the voltage of the oscillator signal passes the voltage of the second phase error signal. By utilizing the oscillator signal and the comparators to generate the control signal, the need for multiple ramp forming circuits can be eliminated. As a result, the jitter associated with multiple ramp forming circuits can also be eliminated.

A better understanding of the features and advantages of the present invention will be obtained by reference to the following detailed description and accompanying drawings which set forth an illustrative embodiment in which the principles of the invention are utilized.

DETAILED DESCRIPTION OF THE INVENTION

Figure 1:
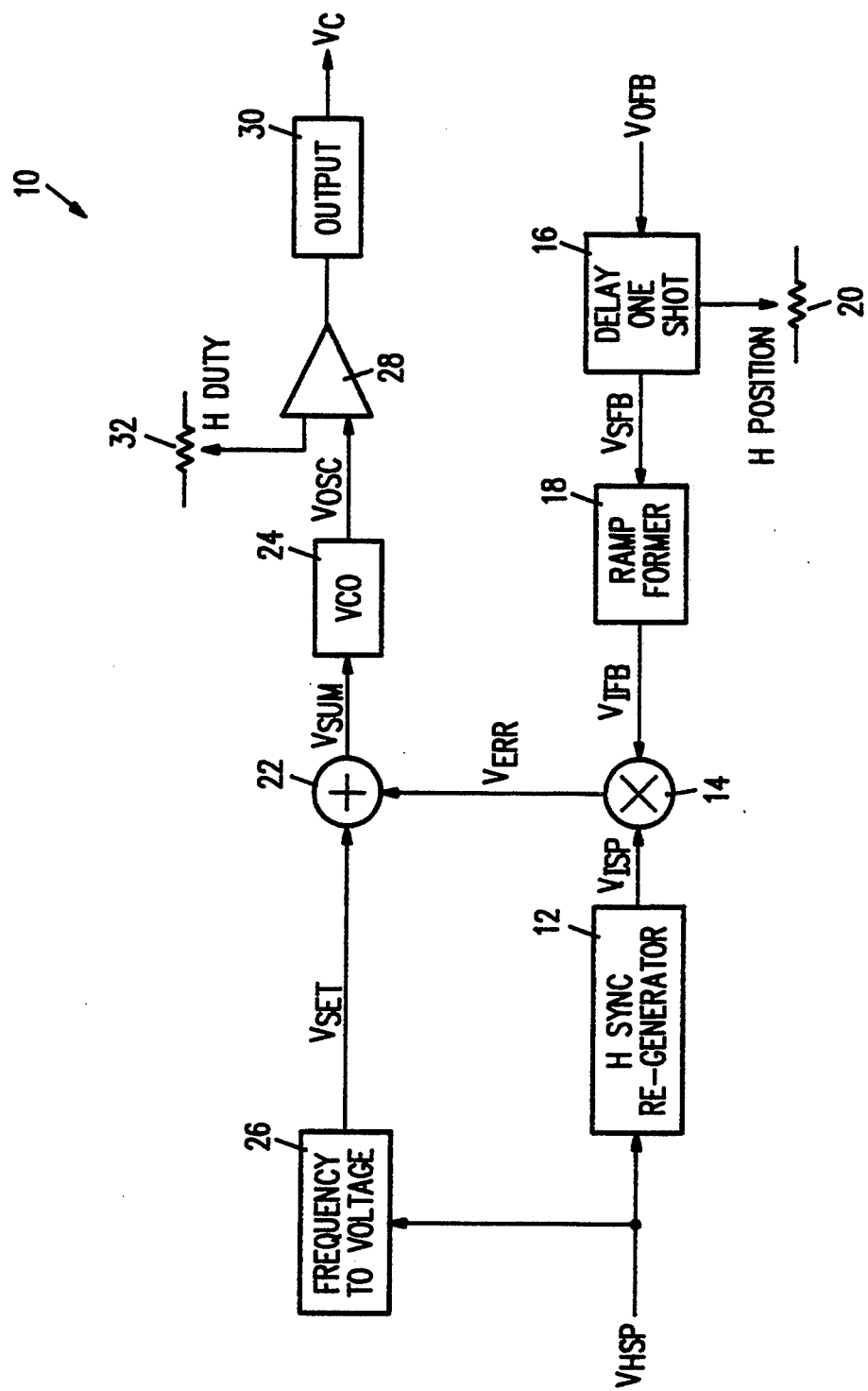
FIG. 1 is a block diagram illustrating a conventional horizontal sweep control phase-lock-loop.
Figure 2:
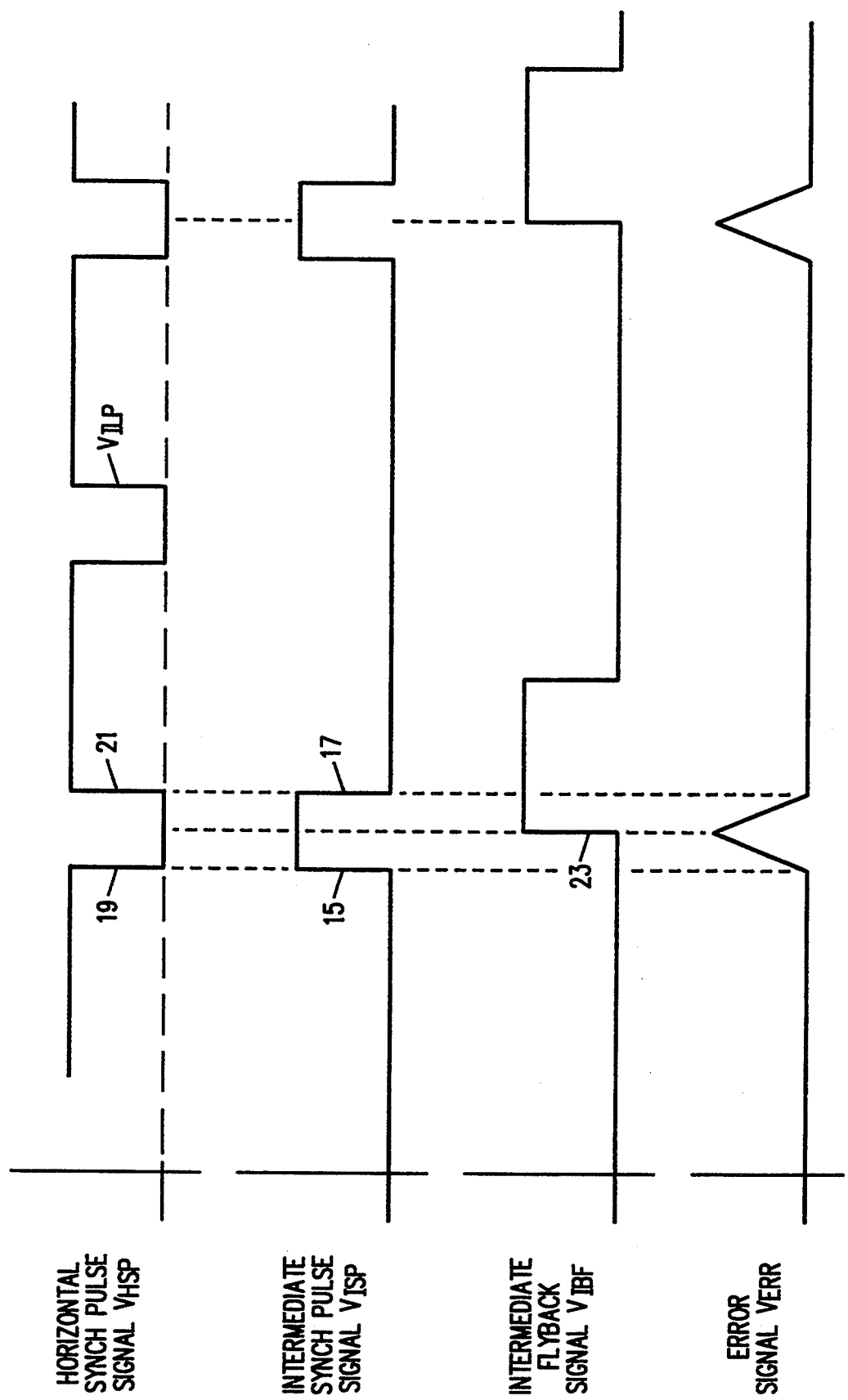
FIG. 2 is a timing diagram illustrating the operation of phase detector 14.
Figure 3:
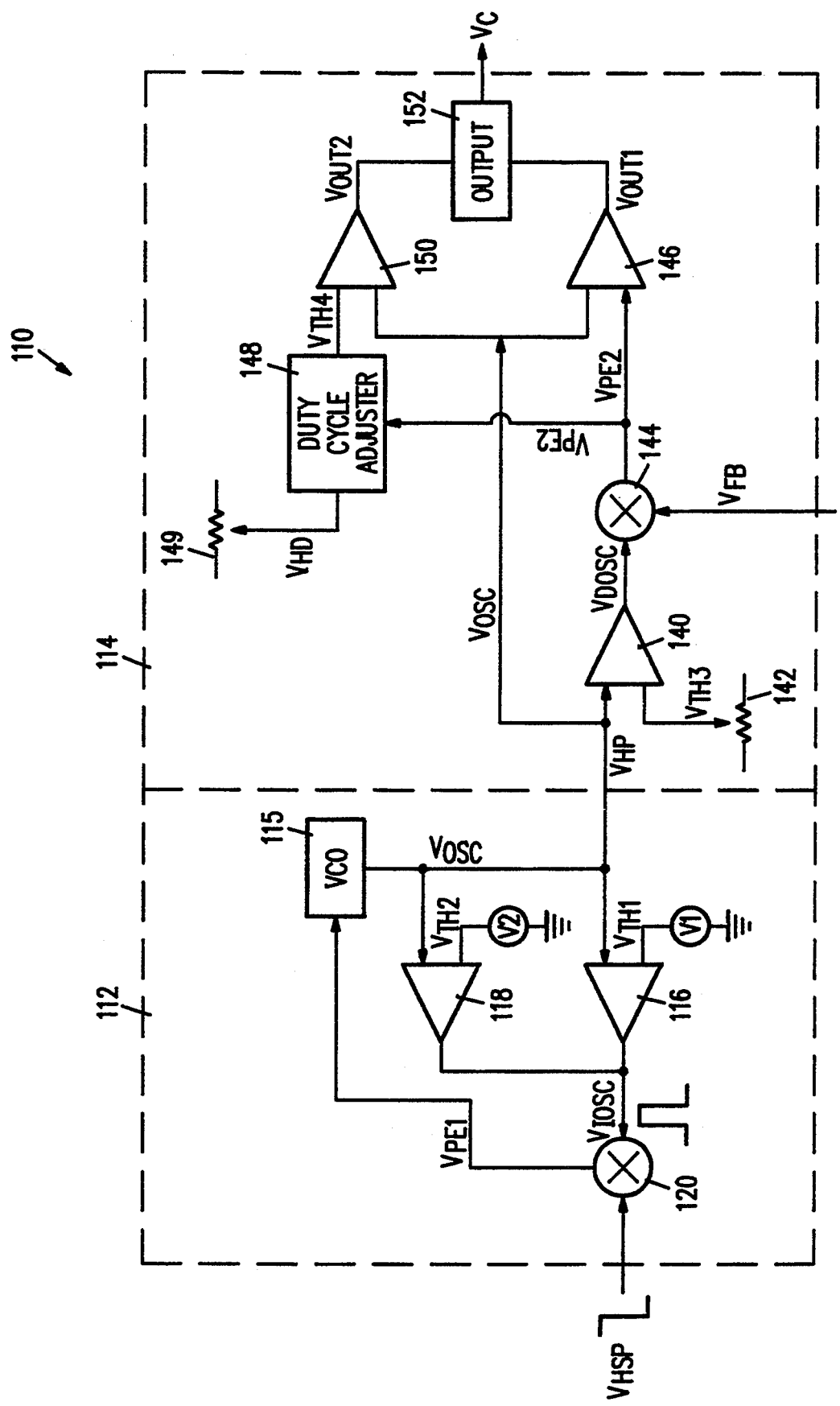
FIG. 3 is a block diagram illustrating a reduced-jitter horizontal sweep control synchronization circuit 110 in accordance with the present invention.

FIG. 3 shows a block diagram of a reduced-jitter horizontal sweep control synchronization circuit 110 in accordance with the present invention. As described above, a horizontal sweep control PLL is commonly utilized to fix a phase relationship between a flyback signal and a horizontal sync pulse signal. As described in greater detail below, synchronization circuit 110 fixes the phase relationship between a flyback signal $V_{FB}$ and a horizontal sync pulse signal $V_{HSP}$ by utilizing an input phase-lock-loop 112 to lock an oscillator output signal $V_{OSC}$ onto the horizontal sync pulse signal $V_{HSP}$, and a phase delay loop 114 to fix the phase relationship between the flyback signal $V_{FB}$ and the oscillator output signal $V_{OSC}$, thereby fixing the phase relationship between the flyback signal $V_{FB}$ and the horizontal sync pulse signal $V_{HSP}$.

As shown in FIG. 3, the input phase-lock-loop 112 of synchronization circuit 110 includes a voltage controlled oscillator (VCO) 115 that generates the oscillator output signal $V_{OSC}$ as a ramp waveform in response to a first phase error signal $V_{PE1}$. A comparator 116 generates a rising edge when the oscillator output signal $V_{OSC}$ passes a first threshold voltage $V_{TH1}$ which is set by a fixed voltage source V1.

Similarly, a comparator 118 generates a falling edge when the oscillator output signal $V_{OSC}$ passes a second threshold voltage $V_{TH2}$ which is set by a fixed voltage source V2. As further shown in FIG. 3, the output of comparator 116 and the output of comparator 118 are connected together to form an intermediate oscillator signal $V_{IOSC}$ from the rising edge generated by comparator 116 and the falling edge generated by comparator 118.

Alternately, a variable voltage source can be utilized in place of either fixed voltage source V1 or V2. Further, when a variable voltage source is utilized in place of fixed voltage source V2, the variable voltage source can be connected to the first threshold voltage $V_{TH1}$.

By utilizing a variable voltage source in place of fixed voltage source V1, the location of the rising edge of the intermediate oscillator signal $V_{IOSC}$ on the ramp waveform of the oscillator output signal $V_{OSC}$ can be adjusted. By utilizing a variable voltage source which is connected to the first threshold voltage $V_{TH1}$ in place of fixed voltage source V2, the duty cycle of pulse width of the intermediate oscillator signal $V_{IOSC}$ can also be adjusted.

A phase detector 120 generates the first phase error signal $V_{PE1}$ in response to the phase difference between the intermediate oscillator signal $V_{IOSC}$ and a horizontal sync pulse signal $V_{HSP}$. Phase detector 120 generates the first phase error signal $V_{PE1}$ by charging a capacitor within phase detector 120 in response to the leading edge of the intermediate oscillator signal $V_{IOSC}$, by discharging the capacitor in response to the leading edge of the horizontal sync pulse signal $V_{HSP}$, and by stopping the discharging of the capacitor in response to the trailing edge of the intermediate oscillator signal $V_{IOSC}$.

In operation, the first phase error signal $V_{PE1}$ causes the phase of the oscillator output signal $V_{OSC}$ to change which, in turn, changes the phase of the intermediate oscillator signal $V_{IOSC}$ generated by comparators 116 and 118. The net result is that the phase of the oscillator output signal $V_{OSC}$ is adjusted so as to reduce any phase difference between the intermediate oscillator output signal $V_{IOSC}$ and the horizontal sync pulse signal $V_{HSP}$. Thus, the input phase-lock-loop 112 fixes the phase relationship between the oscillator output signal $V_{OSC}$ and the horizontal sync pulse signal $V_{HSP}$.

Figure 4:
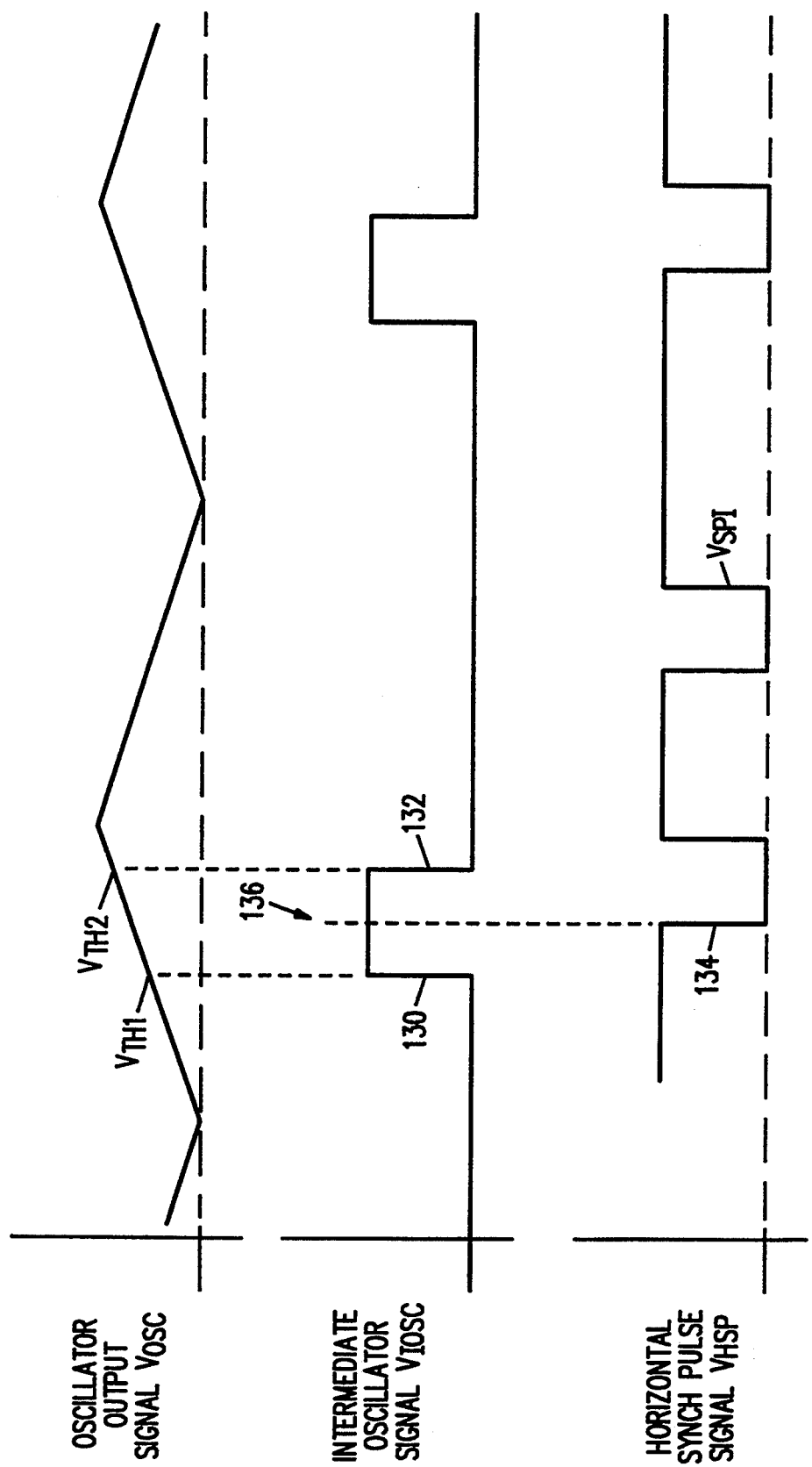
FIG. 4 is a timing diagram illustrating the operation of the input phase-lock-loop 112.

FIG. 4 shows a timing diagram of the operation of the input phase-lock-loop 112 which illustrates the relationship between the oscillator output signal $V_{OSC}$, the intermediate oscillator signal $V_{IOSC}$, and the horizontal sync pulse signal $V_{HSP}$. As shown in FIG. 4, the rising edge 130 of the intermediate oscillator signal $V_{IOSC}$ is formed when the oscillator output signal $V_{OSC}$ exceeds the first threshold voltage $V_{TH1}$.

Similarly, the falling edge 132 of the intermediate oscillator signal $V_{IOSC}$ is formed when the oscillator output signal $V_{OSC}$ exceeds the second threshold voltage $V_{TH2}$. The value of the first and second threshold voltages $V_{TH1}$ and $V_{TH2}$ can be changed if a different pulse width is required. In addition, both comparators 116 and 118 can be can be configured to operate on the falling edge as well as the rising edge of the oscillator output signal $V_{OSC}$.

As also shown in FIG. 4, the falling edge 134 of the horizontal sync pulse signal $V_{HSP}$ corresponds with a center point 136 of the intermediate oscillator signal $V_{IOSC}$ when the intermediate oscillator signal $V_{IOSC}$ is locked to the horizontal sync pulse signal $V_{HSP}$.

As further shown in FIG. 4, the horizontal sync pulse signal $V_{HSP}$ includes an interlaced horizontal sync pulse $V_{SPI}$. Since the interlaced horizontal sync pulse $V_{SPI}$ does not correspond with any of the pulses of the intermediate oscillator signal $V_{IOSC}$, the interlaced horizontal sync pulse signals $V_{SPI}$ are ignored by PLL 110.

Referring again to FIG. 3, the phase delay loop 114 of synchronization circuit 110 includes a comparator 140 that generates a square-wave delayed oscillator signal $V_{DOSC}$ when the oscillator output signal $V_{OSC}$ passes a third threshold voltage $V_{TH3}$. In operation, each time the oscillator output signal $V_{OSC}$ exceeds the third threshold voltage $V_{TH3}$, comparator 140 generates a rising edge.

Thus, by increasing or decreasing the voltage of the third threshold voltage $V_{TH3}$, the phase of the leading edge of the delayed oscillator signal $V_{DOSC}$ can be phase-delayed or phase-advanced, respectively, thereby providing a fixed relationship between the oscillator output signal $V_{OSC}$ and the horizontal sync pulse signal $V_{HSP}$. As shown in FIG. 3, a potentiometer 142 can be utilized to generate the third threshold voltage $V_{TH3}$.

A phase detector 144 generates a second phase error signal $V_{PE2}$ in response to a phase difference between the delayed oscillator signal $V_{DOSC}$ and the flyback signal $V_{FB}$. Phase detector 144 generates the second phase error signal $V_{PE2}$ by charging a capacitor within phase detector 144 in response to the initial rising point of the flyback signal $V_{FB}$, by discharging the capacitor in response to the leading edge of the delayed oscillator signal $V_{DOSC}$, and by stopping the discharging of the capacitor in response to the final falling point of the flyback signal $V_{FB}$.

A comparator 146 generates an output signal $V_{OUT1}$ that transitions from a high voltage to a low voltage each time the oscillator output signal $V_{OSC}$ passes the voltage of the second phase error signal $V_{PE2}$. As is well known, by increasing or decreasing the voltage of the second phase error signal $V_{PE2}$, a phase-delayed or phase-advanced falling edge, respectively, can be generated due to the longer time required to exceed an increased voltage and, conversely, the shorter time required to exceed a decreased voltage.

As further shown in FIG. 3, a duty cycle adjuster 148 generates a fourth threshold voltage $V_{TH4}$ by combining the voltages of the second phase error signal $V_{PE2}$ and an externally-generated horizontal duty cycle control signal $V_{HD}$. In the preferred embodiment, duty cycle adjuster 148 forms the fourth threshold voltage $V_{TH4}$ by subtracting the voltage of the externally-generated horizontal duty cycle control signal $V_{HD}$ from the voltage of the second phase error signal $V_{PE2}$. As shown in FIG. 3, a potentiometer 149 can be utilized to generate the horizontal duty cycle control signal $V_{HD}$.

A comparator 150 generates an output signal $V_{OUT2}$ that transitions from a low voltage to a high voltage when the oscillator output signal $V_{OSC}$ passes the fourth threshold voltage $V_{TH4}$. Since the fourth threshold voltage $V_{TH4}$ is a function of the second phase error signal $V_{PE2}$, increases or decreases in the second phase error signal $V_{PE2}$ will cause the rising edge of output signal $V_{OUT2}$ to track the phase-delay or phase-advance, respectively, of the falling edge of output signal $V_{OUT1}$. Further, since the fourth threshold voltage $V_{TH4}$ is also a function of the externally-generated horizontal duty cycle control signal $V_{HD}$, increases or decreases in the horizontal duty cycle control signal $V_{HD}$ will also cause the rising edge to be phase-delayed or phase-advanced, respectively.

An output driver 152 combines the rising edge of output signal $V_{OUT2}$ and the falling edge of output signal $V_{OUT1}$ by utilizing well known circuitry to form a control signal $V_C$. As described above, a resonant circuit utilizes the control signal $V_C$ to turn on and off a transistor to sink a positive yoke current which, in turn, creates a positive magnetic field. As also described above, the flyback signal $V_{FB}$ is generated when the transistor turns off and stops conducting the positive yoke current.

In operation, the second phase error signal $V_{PE2}$ causes the phase of the falling edge of the control signal $V_C$ to change which, in turn, causes the phase of the rising edge of flyback signal $V_{FB}$ to change so as to reduce any phase difference between the flyback signal $V_{FB}$ and the delayed oscillator signal $V_{DOSC}$. Thus, the phase delay loop 114 fixes the phase relationship between the flyback signal $V_{FB}$ and the oscillator output signal $V_{OSC}$.

Figure 5:
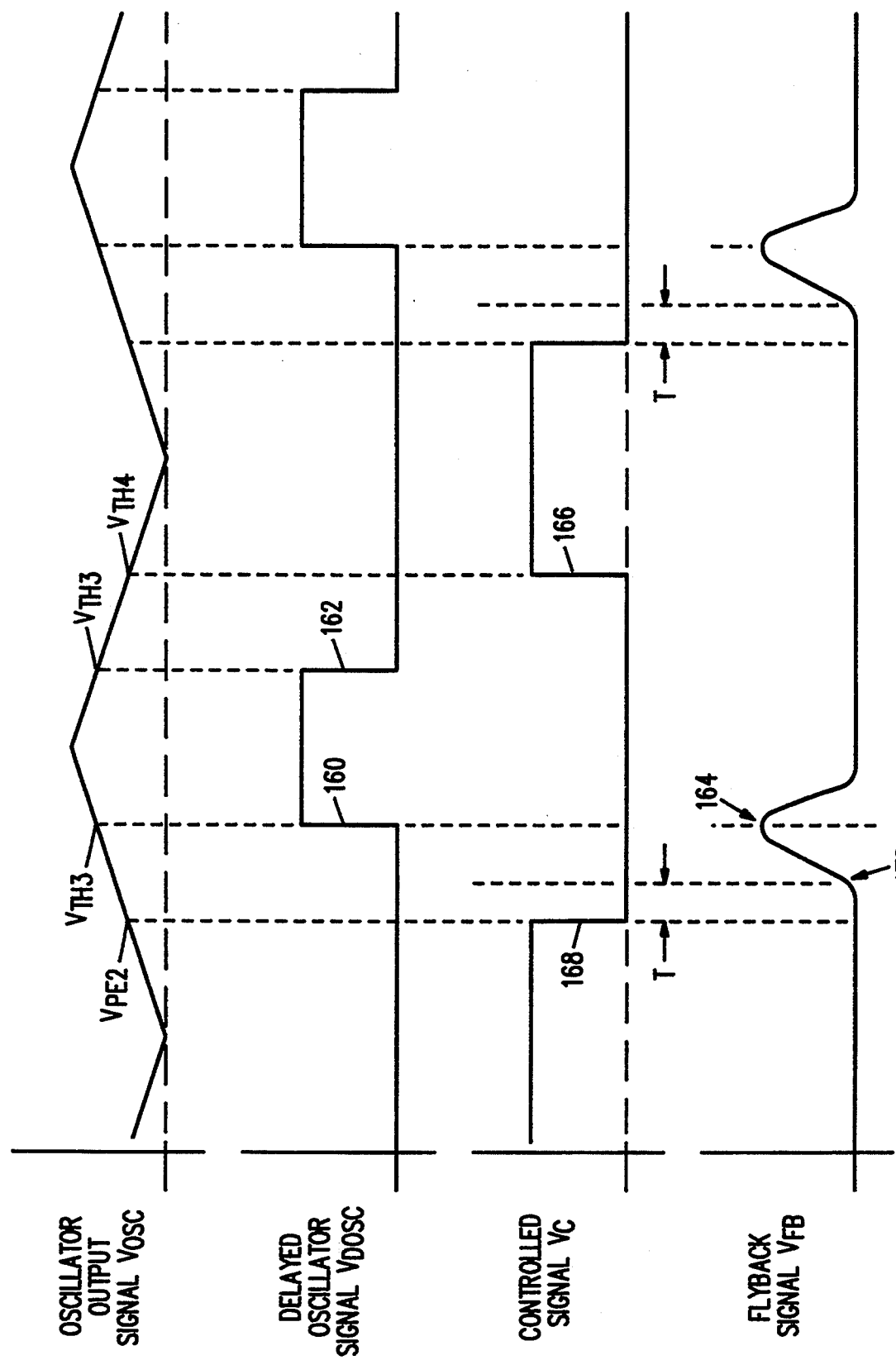
FIG. 5 is a timing diagram illustrating the operation of the phase delay loop 114.

FIG. 5 shows a timing diagram of the operation of the phase delay loop 114 which illustrates the relationship between the oscillator output signal $V_{OSC}$, the delayed oscillator signal $V_{DOSC}$, the control signal $V_C$, and the flyback signal $V_{FB}$.

As shown in FIG. 5, the rising edge 160 of the delayed oscillator signal $V_{DOSC}$ is formed when the oscillator output signal $V_{OSC}$ exceeds the third threshold voltage $V_{TH3}$. Similarly, the falling edge 162 of the delayed oscillator signal $V_{DOSC}$ is formed when the oscillator output signal $V_{OSC}$ falls below the third threshold voltage $V_{TH3}$. As further shown in FIG. 5, the rising edge 160 of the delayed oscillator signal $V_{DOSC}$ corresponds with a center point 164 of the flyback signal $V_{FB}$ when the delayed oscillator signal $V_{DOSC}$ is locked to the flyback signal $V_{FB}$.

As additionally shown in FIG. 5, the rising edge 166 of the control signal $V_C$ is formed when the oscillator output signal $V_{OSC}$ falls below the fourth threshold voltage $V_{TH4}$. Similarly, the falling edge 168 of the control signal $V_C$ is formed when the oscillator output signal $V_{OSC}$ exceeds the voltage of the second phase error signal $V_{PE2}$. A capacitor (not shown) is connected to the node which connects detector 144, comparator 146, and adjuster 148 to hold the voltage of the second phase error signal $V_{PE2}$. In addition, both comparators 146 and 150 can be can be configured to operate on the falling edge as well as the rising edge of the oscillator output signal $V_{OSC}$.

Further, the falling edge 168 of the control signal falls a time T prior to the initial rising point of 170 the flyback signal $V_{FB}$. As described above, a transistor in the resonance circuit turns on and off to sink the positive yoke current. When turned on, the transistor is saturated. Since the transistor is saturated, the time T represents the time required before the transistor actually stops conducting the positive yoke current.

Since the falling edge 168 of the control signal $V_C$ plus the time T controls the rising point 170 of flyback signal $V_{FB}$, by controlling the falling edge 168 the phase position of the rising point 170 of flyback signal $V_{FB}$ can be controlled, thereby setting phase relationship between the flyback signal $V_{FB}$ and the horizontal sync pulse signal $V_{HSP}$.

Figure 6:
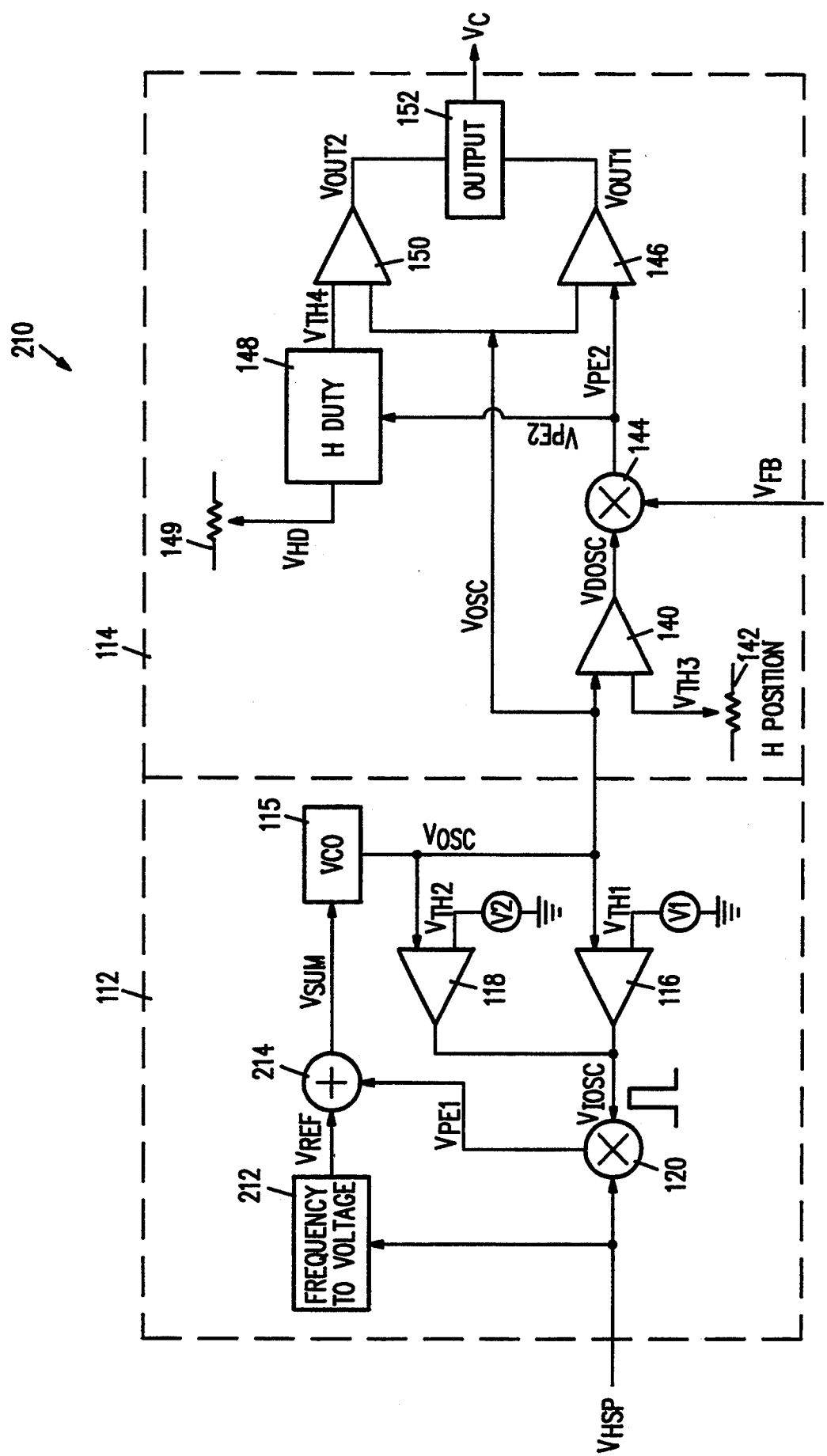
FIG. 6 is a block diagram illustrating an alternative synchronization circuit 210.

FIG. 6 shows a block diagram of an alternative synchronization 210. As shown in FIG. 6, synchronization 210 is equivalent to synchronization 110 except for the inclusion of a frequency-to-voltage converter 212 and a summer 214. Frequency-to-voltage converter 212 and summer 214 allow synchronization 210 to operate on horizontal sync pulse signals over a wide range of operating frequencies.

As shown in FIG. 6, frequency-to-voltage converter 212 has it input connected to the horizontal sync pulse signal $V_{HSP}$. Summer 214 has one input connected to the output of frequency-to-voltage converter 212, its remaining input connected to phase detector 120, and its output connected to VCO 115.

In operation, frequency-to-voltage converter 212 senses the frequency of the horizontal sync pulse signal $V_{HSP}$, which may typically vary over a range of two to one, depending upon the operating frequency of the CRT display, and generates a reference DC voltage $V_{REF}$ in response. The reference DC voltage $V_{REF}$ has a magnitude which is a function of the frequency of the horizontal sync pulse signal $V_{HSP}$.

Summer 214 generates a summed voltage $V_{SUM}$ by summing the reference DC voltage $V_{REF}$ and the first phase error signal $V_{PE1}$. The summed voltage $V_{SUM}$ is fed to the input of VCO 115. VCO 115 and frequency-to-voltage converter 212 are implemented such that VCO 115 will assume a nominal operating frequency approximately equal to the frequency of the horizontal sync pulse signal $V_{HSP}$. Since the frequency of the oscillator output signal $V_{OSC}$ is close to the frequency of the horizontal sync pulse signal $V_{HSP}$, PLL 210 is able to acquire or lock on to the horizontal sync pulse signal $V_{HSP}$.

Thus, frequency-to-voltage converter 212 and summer 214 allow synchronization 210 to operate on horizontal sync pulse signals over a wide range of operating frequencies. Therefore, any different CRT display types, such as multisync and the like can be used by incorporating synchronization 210 without the need to manually readjust synchronization 210 when the display type is changed.

In the preferred embodiment of the present invention, the components of synchronization 110 and 210 are implemented in a common monolithic integrated circuit.

It should be understood that various alternatives to the structures described herein may be employed in practicing the present invention. It is intended that the following claims define the scope of the invention and that structures and methods within the scope of these claims and their equivalents be covered thereby.

What is claimed is:

1. A synchronization circuit for controlling a phase relationship between a first input signal and a second input signal, the first input signal having a pulse waveform, the second input signal being generated by a resonance circuit in response to a control signal produced by the synchronization circuit, the synchronization circuit comprising:

a controlled oscillator that generates an oscillator signal having a ramp waveform in response to a first phase error signal, the phase of the oscillator signal varying with the first phase error signal;

a dual comparator stage that generates a first intermediate oscillator signal having a pulse waveform in response to the oscillator signal, a first threshold voltage, and a second threshold voltage;

a first detector that locks an edge of the first input signal to the center of the first intermediate oscillator signal, and that generates the first phase error signal in response thereto, the first phase error signal indicating the phase difference between the edge of the first input signal and the center of the first intermediate oscillator signal;

a horizontal position comparator that generates a second intermediate oscillator signal having a pulse waveform in response to the oscillator signal and a third threshold voltage;

a second detector that locks an edge of the second intermediate oscillator signal to the center of the second input signal, and that generates a second phase error signal having a voltage in response thereto, the second phase error signal indicating the phase difference between the edge of the second intermediate oscillator signal and the center of the second input signal;

a combiner that generates a fourth threshold voltage by combining the voltage of the second phase error signal and a duty cycle voltage; and a phase shifter that produces the control signal having a pulse waveform in response to the oscillator signal, the voltage of the second phase error signal, and the fourth threshold voltage, the control signal having a phase which varies with the second phase error signal.

2. The circuit of claim 1 wherein the phase shifter includes a first phase shift comparator that generates the rising edge of the control signal when the voltage of the oscillator signal passes the fourth threshold voltage, and a second phase shift comparator that generates the falling edge of the control signal when the voltage of the oscillator signal passes the voltage of the second phase error signal.

3. The circuit of claim 1 wherein the dual comparator stage includes a first pulse waveform comparator that generates the rising edge of the first intermediate oscillator signal when the voltage of the oscillator signal passes the first threshold voltage, and a second pulse waveform comparator that generates the falling edge of the intermediate oscillator signal when the voltage of the oscillator signal passes the second threshold voltage.

4. The circuit of claim 2 wherein the control signal has a pulse width which is a function of the difference between the fourth threshold voltage and the voltage of the second phase error signal.

5. The circuit of claim 4 wherein the duty cycle voltage is a variable voltage, whereby the duty cycle of the control signal can be varied by varying the duty cycle voltage.

6. The circuit of claim 5 wherein the the third threshold voltage is a variable voltage, whereby the phase of the second intermediate oscillator signal can be shifted by varying the third threshold voltage.

7. The circuit of claim 6 wherein the duty cycle voltage is varied by a potentiometer.

8. The circuit of claim 7 wherein the the third threshold voltage is varied by a potentiometer.

9. The circuit of claim 8 wherein the first detector comprises a phase detector.

10. The circuit of claim 9 wherein the second detector comprises a phase detector.

11. A method for controlling a phase relationship between a first input signal and a second input signal, the first input signal having a pulse waveform, the second input signal being generated by a circuit in response to a control signal produced by a synchronization circuit, the method comprising the steps of:

providing a first threshold voltage, a second threshold voltage, a third threshold voltage, and a duty cycle voltage;

generating an oscillator signal having a ramp waveform in response to a first phase error signal, the phase of the oscillator signal varying with the first phase error signal;

generating a first intermediate oscillator signal having a pulse waveform in response to the oscillator signal, the first threshold voltage, and the second threshold voltage;

locking an edge of the first input signal to the center of the first intermediate oscillator signal, and generating the first phase error signal in response thereto, the first phase error signal indicating the phase difference between the edge of the first input signal and the center of the first intermediate oscillator signal;

generating a second intermediate oscillator signal having a pulse waveform in response to the oscillator signal and the third threshold voltage;

locking an edge of the second intermediate oscillator signal to the center of the second input signal, and generating a second phase error signal having a voltage in response thereto, the second phase error signal indicating the phase difference between the edge of the second intermediate oscillator signal and the center of the second input signal;

generating a fourth threshold voltage by combining the voltage of the second phase error signal and the duty-cycle voltage; and producing the control signal having a pulse waveform in response to the oscillator signal, the voltage of the second phase error signal, and the fourth threshold voltage, the control signal having a phase which varies with the second phase error signal.

12. A synchronization circuit for controlling a phase relationship between a first input signal and a second input signal, the first input signal having a pulse waveform, the second input signal being generated by a circuit in response to a control signal produced by the synchronization circuit, the synchronization circuit comprising:

a frequency-to-voltage converter that produces a frequency signal in response to the first input signal, the magnitude of the frequency signal being a function of the frequency of the first input signal;

a controlled oscillator that generates an oscillator signal having a ramp waveform in response to a summed signal, the phase of the oscillator signal varying with the summed signal;

a dual comparator stage that generates a first intermediate oscillator signal having a pulse waveform in response to the oscillator signal, a first threshold voltage, and a second threshold voltage;

a first detector that locks an edge of the first input signal to the center of the first intermediate oscillator signal, and that generates the first phase error signal in response thereto, the first phase error signal indicating the phase difference between the edge of the first input signal and the center of the first intermediate oscillator signal;

a summer that generates a summed signal by adding the frequency signal and the first phase error signal;

a horizontal position comparator that generates a second intermediate oscillator signal having a pulse waveform in response to the oscillator signal and a third threshold voltage;

a second detector that locks an edge of the second intermediate oscillator signal to the center of the second input signal, and that generates a second phase error signal having a voltage in response thereto, the second phase error signal indicating the phase difference between the edge of the second intermediate oscillator signal and the center of the second input signal;

a combiner that generates a fourth threshold voltage by combining the voltage of the second phase error signal and a duty-cycle voltage; and a phase shifter that produces the control signal having a pulse waveform in response to the oscillator signal, the voltage of the second phase error signal, and the fourth threshold voltage, the control signal having a phase which varies with the second phase error signal.

13. The circuit of claim 12 wherein the phase shifter includes a first phase shift comparator that generates the rising edge of the control signal when the voltage of the oscillator signal passes the fourth threshold voltage, and a second phase shift comparator that generates the falling edge of the control signal when the voltage of the oscillator signal passes the voltage of the second phase error signal.

14. The circuit of claim 13 wherein the dual comparator stage includes a first pulse waveform comparator that generates the rising edge of the first intermediate oscillator signal when the voltage of the oscillator signal passes the first threshold voltage, and a second pulse wave comparator that generates the falling edge of the intermediate oscillator signal when the voltage of the oscillator signal passes the second threshold voltage.

15. The circuit of claim 13 wherein the duty cycle voltage is a variable voltage.

16. The circuit of claim 13 wherein the duty-cycle voltage is varied by a potentiometer.

17. The circuit of claim 13 wherein the third threshold voltage is a variable voltage.

* * * * *